May 9, 1944.    R. D. FREEMAN    2,348,677
POLYMERIZATION IN METAL MOLDS
Filed Oct. 30, 1942
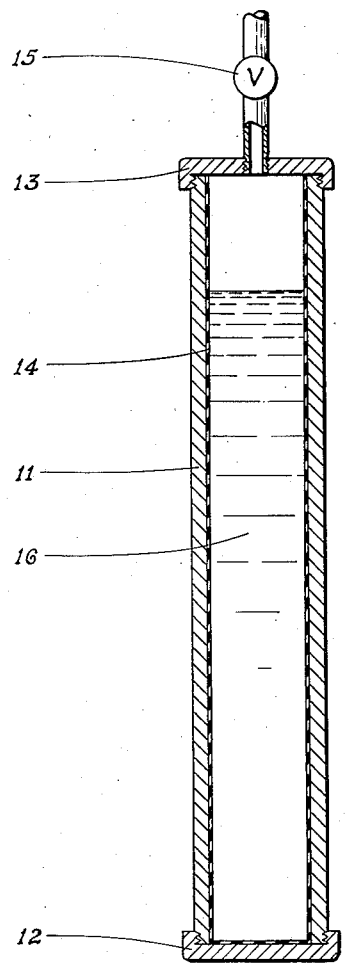
INVENTOR.
Richard D. Freeman
BY
Griswold & Burdick
ATTORNEYS Patented May 9, 1944

2,348,677

UNITED STATES PATENT OFFICE 2,348,677

POLYMERIZATION IN METAL MOLDS

Richard D. Freeman, Midland, Mich., assignor to The Dow Chemical Company, Midland, Mich., a corporation of Michigan Application October 30, 1942, Serial No. 463,952

4 Claims. (Cl. 18—47)

This invention relates to the polymerization of resin-forming liquids in molds.

The preparation of molded objects from synthetic resins by introducing a resin-forming liquid into a metal mold and polymerizing it in place is a well known procedure. From a practical standpoint, however, the use of this process has been severely limited by the fact that when polymerization is carried out in molds formed of the common metals such as iron, steel, copper, lead, brass, and bronze, the metal frequently acts as a polymerization retarder and often causes brittleness, instability, or discoloration of the polymeric products. In addition, there is often a very strong tendency for the polymerized product to stick to the metal of the mold, making release without fracture almost impossible. No adequate method of overcoming this difficulty has been known and in consequence the fabrication of resinous objects by polymerization in metal molds has never become a commercial reality.

It has now been found, however, that chemical interaction between the metal of the mold and the resin-forming liquid being polymerized and also the sticking of the resinous object in the mold can be readily and effectively prevented by coating the inner surfaces of the mold prior to polymerization with a film of cellulose glycolic acid or a salt thereof.

In so far as is known, any of the salts of cellulose glycolic acid may be effectively employed as a mold coating in accordance with the invention. In general, however, the salts of cellulose glycolic acid with inorganic bases, especially sodium cellulose glycolate, aluminum cellulose glycolate, and ammonium cellulose glycolate are greatly to be preferred, both because of their greater ease of application and greater effectiveness.

Reference is made to the accompanying drawing in which, in the interest of clarity, certain features are shown on a somewhat exaggerated scale. A mold body 11, which may be of any convenient shape and which is here shown as a tubular mold used in making rods, is provided with caps 12 and 13 by means of which the ends of the mold are securely sealed. Although not usually necessary, a vent valve 15 may be provided in one of the caps, if desired, through which the pressure inside the mold may be equalized with the pressure outside the mold, before the mold is opened. In practicing the invention, the cap 13 is removed and the surface of the mold cavity is coated with an aqueous solution of a salt of cellulose glycolic acid. The aqueous solution is then dried leaving a thin film 14 of the dry metal salt of cellulose glycolic acid on the surface. The liquid 16 which is to be polymerized is then poured into the mold and the cap 13 secured in place. The mold is then heated, e. g. by immersing it in a heating bath at the desired temperature for the desired time. The mold and contents are cooled, the vent opened, if desired, and the caps 12 and 13 removed. The molded rod may then be removed easily from the mold.

In practice, before each polymerization, the inner surfaces of the metal mold are coated, as by dipping, spraying, etc., with a solution of cellulose glycolic acid or one of its salts in any suitable solvent, usually water or an aqueous solution of a volatile base such as ammonia, after which the mold is allowed to dry. The polymerizable liquid is then poured into the mold, and the mold and contents subjected to polymerizing conditions, in accordance with known practice. When polymerization is complete, the solid resinous object is easily removed from the mold. In general, the coating film has no tendency to stick to the molded object. However, if any of it should cling to the molded piece, it may be removed by a simple buffing operation or by washing in water or an aqueous alkaline solution.

The use of cellulose glycolic acid and its salts as mold coatings is greatly to be preferred to the use of water-soluble natural gums, starch, dextrins, gelatine, glue, etc., for the same purpose. These latter materials form only weak or discontinuous films on the mold surfaces and hence are relatively ineffective either in preventing contamination of the resin-forming liquid or in eliminating sticking of the molded object.

In so far as is known the use of cellulose glycolic acid and its salts as mold coatings is applicable to the polymerization in metal molds of any resin-forming material which can be polymerized to a solid product. It is of particular value in the polymerization of styrene and other polymerizable vinyl compounds, such as vinyl chloride, vinyl acetate, esters of acrylic and methacrylic acid, etc. The polymerizable compound is employed in liquid form, either as the monomeric material or as a partially polymerized product.

The following example will illustrate the invention:

Example

A tubular iron mold 1.5 inches in diameter and 12 inches long was coated with a 3 per cent aqueous solution of a medium viscosity sodium cellulose glycolate, after which the mold was dried. It was then filled with a 70 per cent solution of polystyrene in monostyrene, closed, and heated for 5 days at 125° C. After cooling, the mold was opened. The resulting polystyrene rod released easily from the mold by light tapping, and was clear and colorless.

A second molding made in identical fashion with the exception that the mold used was not coated, was highly discolored, and stuck so badly that it was not possible to remove it without breaking it to pieces.

It is to be understood that the foregoing description is illustrative rather than strictly limitative and that the invention is co-extensive in scope with the following claims.

I claim:

1. A mold for the preparation of resinous objects by the polymerization of a resin-forming liquid comprising a metal body having a mold cavity therein, the surfaces of the cavity being coated with a film of a substance selected from the class consisting of cellulose glycolic acid and salts thereof.

2. A mold for the preparation of resinous objects by the polymerization of a resin-forming liquid comprising an iron body having a mold cavity therein, the surfaces of the cavity being coated with a film of sodium cellulose glycolate.

3. A mold for the preparation of resinous objects by the polymerization of a resin-forming liquid comprising an iron body having a mold cavity therein, the surfaces of the cavity being coated with a film of aluminum cellulose glycolate.

4. A mold for the preparation of resinous objects by the polymerization of a resin-forming liquid comprising an iron body having a mold cavity therein, the surfaces of the cavity being coated with a film of ammonium cellulose glycolate.

RICHARD D. FREEMAN.